Sept. 18, 1951 J. C. NILSSON 2,568,558
ADJUSTABLE COMPARATOR
Filed May 15, 1947
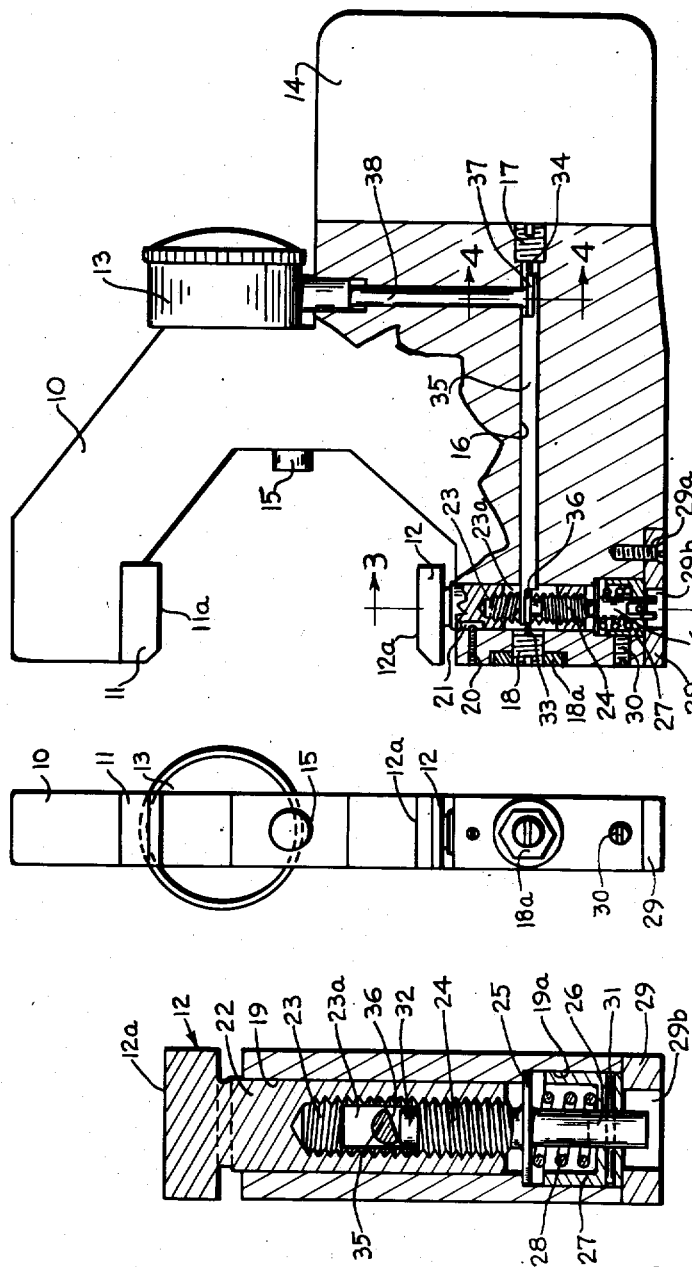
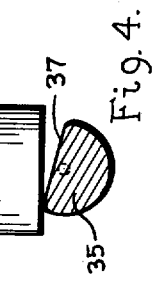
John C. Nilsson
INVENTOR Patented Sept. 18, 1951

2,568,558

UNITED STATES PATENT OFFICE 2,568,558

ADJUSTABLE COMPARATOR

John Charles Nilsson, Hyde Park, N. Y., assignor to Nilsson Gage Company, Inc., Poughkeepsie, N. Y., a corporation of New York Application May 15, 1947, Serial No. 748,195

8 Claims. (Cl. 33—147)

This invention relates to gauges suitable for determining the actual dimension of a part in units of linear measurement and more particularly to a dial snap gauge, by the use of which, the actual dimension of a part is determined by comparison with a standard or fixed dimension to which the gauge has been set.

There has arisen recently a large scale demand for a dial snap gauge in which the gauging surfaces or elements are adapted particularly to measure circularly sectioned pieces of work which are relatively inaccessible when using snap gauges of normal construction. The dial snap gauge herein set forth is relatively thin in comparison to its depth, the gauging surfaces being at one edge of the frame and the indicator at the other end thereof.

It is an object of this invention to provide a dial snap gauge wherein the dial indicator is affixed to the gauge frame at a point remote from the gauging surfaces.

It is another object of this invention to provide a dial snap gauge wherein the overall thickness is relatively small as compared to the overall depth.

It is a further object of this invention to provide a dial snap gauge having a manually operated range adjustment for one of the gauging surfaces, sometimes called a spindle, and a gauging point, whereby the dial indicator is actuated, mounted within the spindle.

It is a still further object of this invention to provide in conjunction with the last mentioned object, means whereby the normal or at rest position of the contact surfaces of the gauging point does not move relative to the gauge frame regardless of the manually adjusted position of the spindle.

Other objects and features of this invention will appear from the following detailed description of one embodiment thereof taken in connection with the accompanying drawing in which the same reference numerals are applied to identical parts in the several figures and in which Figure 1 is a side elevational view, partly in section, of a gauge constructed in accordance with the invention;

Figure 2 is a front elevational view;

Figure 3 is a partial, enlarged, front elevational view taken along line 3—3 of Figure 1; and Figure 4 is a corresponding section on the line 4—4 of Figure 1.

Referring first to Figure 1, a gauge constructed according to this invention comprises generally a frame member 10 of a shape commonly referred to as the C-bar type, an anvil or rigid gauging member 11 having a gauging surface 11a, mounted directly on the frame 10, and a spindle or movable gauging member 12 having a gauging surface 12a, mounted in frame 10 at a point opposite the anvil 11 and in gauging relation therewith. A dial indicator 13 is mounted in the frame 10 at a point remote from both the anvil and spindle. A hand grip 14 of conventional type is affixed to the frame in accordance with usual practice. A shock proof stop pin is indicated at 15.

The frame member 10 is provided with a transverse passage 16 extending throughout the lower portion thereof, the passage being threaded at each end to receive screw plugs 17 and 18 for a purpose to be explained below. The frame 10 is also provided with a through opening or recess 19 (Fig. 3) arranged at right angles to the passage 16 and intersecting the same. Spindle 12 is mounted in opening 19 and adapted for reciprocal movement therein. Rotation of spindle 12 is prevented by the pin 20, the same being mounted in the frame and extending into a vertical slot 21 cut in the periphery of spindle 12. The axial length of slot 21, may be determined so as to limit the maximum and minimum distance between the gauging surfaces 11a and 12a when the spindle 12 is manually adjusted by means explained in detail hereinafter.

The spindle 12 is of two piece construction, as best shown in Figure 3, and is comprised of a body section 22 having a threaded axial bore 23 extending partially therethrough and a transverse bore 23a extending completely therethrough of a size somewhat larger than passage 16, and a bolt having a threaded portion 24 adapted for engagement with the threaded axial bore 23, an enlarged flange portion 25, and a slotted or bifurcated portion 26. The flange 25 is of a greater diameter than body portion 22 of spindle 12. The slotted portion 26 is preferably of a smaller diameter than the threaded portion 24 of the bolt. The opening 19 has a portion 19a thereof remote from the spindle gauging surface 12a, of a diameter sufficient to accommodate the entry of flanged portion 25 of the bolt. Cap 27 has a central opening in the end thereof permitting the slotted portion 26 of the bolt 24 to extend through and beyond the cap. The cap 27 is retained in opening 19a by a cover plate 29 affixed to the frame 10 as by screw 29a. A locking screw 30 mounted in the frame 10 serves to hold cap 27 against rotation. A pin 31 is mounted in the end of cap 27 transversely of the opening therethrough and extends through the furcations of slotted portion 26 of the bolt 24. Between the inner surface of the cap 27 and the slotted portion 26 of the bolt 24 a coil spring 28 is retained. The spring 28 axially projects the spindle assembly through the opening 19.

The inner end 32 of the bolt beyond the threaded portion 24 is ground to a true flat surface and arranged in a plane normal to the longitudinal axis of the bolt and through the longitudinal axis of passage 16. Mounted in passage 16 and journaled on pivot points 33 and 34 extending from screw plugs 18 and 17, respectively, is a cam rod 35 having cam surfaces 36 and 37 formed at the ends thereof.

The general angular relation of the cam surfaces is indicated in Figures 3 and 4 on an enlarged scale. The pivot points 33 and 34 are received in indentations located at each end of the rod 35 on its longitudinal axis. The gauging point 32 bears against cam surface 36 and the operating stem 38 of dial indicator 13 bears against cam surface 37. The internal tension of the dial indicator is exerted, in the embodiment shown, downward against cam surface 37 and the tension of spring 28 is exerted, in the embodiment shown, upward through the means of the gauging point 32 against cam surface 36 to the extent permitted by the shoulder between bores 19 and 19a and the flange portion 25 of the bolt. The tension of spring 28 must be in excess of the internal tension of the indicator mechanism and the respective tensions must be exerted in opposite directions against cams 36 and 37 formed on the ends of rod 35. In this way, the indicator mechanism will follow any movement of the gauging point 32 without there being any slack motion to give rise to a false indication.

When it is desired to set the gauge to a fixed dimension or move the spindle gauging surface to change from one fixed dimension to another, the adjustment can be made without changing the relation of the gauging point and the indicator operating mechanism previously described. The locking screw 30 is loosened from cap 27 and a screw driver inserted through the opening 29b in cover plate 29 into the slot in portion 26 of the bolt. The bolt may then be turned and the spindle 22 advanced or retracted in opening 19, thereby bringing the gauging surfaces 11a and 12a to the desired fixed dimension. The locking screw 30 is then tightened against cap 27. In actual practice, the fixed dimension is generally set at a few 10,000ths of an inch under the true dimension.

The maximum longitudinal travel of the spindle, after the gauge has been set to a fixed dimension, is determined by the distance between the flange portion 25 of the bolt and the inner edge of cap 27, and that distance should be within the maximum scale of the indicator used in order that the indicator will not be damaged.

A locking nut 18a is provided in conjunction with screw plug 18 and plug 17 is bottomed in its bore in order that the pivot bearings 34 and 33 may be held in adjustment.

It will be seen that the construction above described results in a gauge which is quick and easy of adjustment and in which the gauging point is entirely within the spindle. The gauging pin is therefor protected from injury due to rough handling and not subject to the wear of being moved against the various surfaces being gauged.

A gauge built according to this invention is easy to clean and service, since all the internal parts are removable from the frame and, when they are removed, leave only straight open passages through the frame. The maximum width of a gauge made according to this invention is determined by the diameter of the cap 27 which in actual practice is about 2½ to 3 times the diameter of the rod 35. The diameter of the spindle 12 must be large enough to accommodate a transverse bore 23a through which rod 35 may be withdrawn.

To assemble the gauge, spindle 12 is inserted in frame opening 19 with slot 21 in position to register with guide pin 20. When pin 20 is inserted, the spindle will be held in place in the frame. Screw plug 17 is inserted in the frame and the hand grip 14 attached. Rod 35 is inserted in passage 16 through the transverse bore 23a in spindle 12. Screw plug 18 is then inserted in the open end of passage 16, thereby supporting rod 35 between pivot bearings 33 and 34. The range adjustment bolt is next inserted through frame opening 19a and screwed into spindle 22. Spring 28 is placed around the slotted portion 26 of the bolt and cap 27 placed over the spring. Cover plate 29 is then affixed to the frame to hold the cap within the frame. After the gauging surfaces 11a and 12a have been set to a fixed dimension in the manner heretofore described, locking screw 30 is turned up against cap 27. To disassemble the gauge for cleaning or servicing, the procedure is reversed.

In the operation of the gauge, the gauging surfaces 11a and 12a are passed over the surface to be gauged. Since, as before noted, the gauging surfaces have been set to a fixed dimension slightly smaller than the true dimension, spindle 12 will be depressed (anvil 11 being fixed to the frame) and in turn will depress the bolt against tension of spring 28. The internal gauging point 32 which is a part of the bolt will also be depressed and cam surface 36, under the urging of the internal tension of the dial indicator working through cam 37 and rod 35, will rotate about pivot point 33. As rod 35 rotates under the guidance of cam 36, cam 37 will be rotated and the dial indicator operating mechanism will be actuated thereby resulting in a visual indication on the indicator face of the amount of movement of the gauging surface 12a.

I am aware that comparator gauges having a manually adjustable anvil and a spindle acting as a gauging pin are well known in the art. An example of such a construction is set forth in Patent No. 2,412,665 issued December 17, 1946. I am also aware that comparator gauges having a retractable gauging point are well known in the art. An example of such a construction is set forth in Patent No. 2,016,659 issued October 8, 1935. A gauge made in accordance with this invention differs from these known types of construction in that all adjustments and gauging are effected in and through the means of the spindle only, and further, that the gauging point, being entirely within the spindle, does not require retraction for clearance purpose or protection against rough handling. Means are also disclosed in this invention whereby in the normal or at rest position of the gauging point, the relation of the gauging point and the frame does not change regardless of the movement of the spindle due to the manual adjustment of the same.

The embodiment of the invention described herein is to be understood to be by way of illustration and not by way of limitation. The scope of the invention is defined only in the appended claims.

I claim:

1. A gauging device adapted for remote control of an associated dial indicator mechanism, the combination of a frame structure having a shouldered recess therein and a passage therethrough, said passage being arranged at right angles to and opening into said recess, a rotatable cam rod mounted in said passage having one end thereof extending into said recess, an anvil having an exposed gauging surface thereon rigidly mounted on said frame, a spring pressed spindle assembly having an exposed gauging surface thereon and movably mounted in the recess, said second mentioned gauging surface being arranged in a gauging relation with said first mentioned gauging surface and spaced therefrom, said spindle assembly comprising a body section and a manually adjustable bolt, the body section being provided with a threaded axial bore beginning at the end remote from said second gauging surface and a transverse bore at the locus of the intersection of the frame recess and passage adapted to receive the extended one end of the cam rod, the manually adjustable bolt being mounted in said threaded axial bore, said bolt having its outer end projecting beyond the spindle and having a flange thereon adapted to be held in spring pressed abutment against the shoulder of the frame recess, the inner end of the bolt extending within the area of the transverse bore and being adapted to coordinate with said extended one end of the cam rod for actuating the dial indicator operating mechanism.

2. In a gauging device, a frame structure including a shouldered recess therein, a spindle assembly mounted within the recess, an anvil, said anvil and spindle being arranged in a gauging relation in the frame, an indicator means including an operating mechanism therefor mounted on the frame in a position remote from the spindle assembly, and a rotatable cam rod mounted in the frame structure and having one end thereof extending into said recess and adapted to mechanically transmit motion of the spindle to the indicator means, said spindle assembly comprising a gauging surface, a body section adapted for non-rotating reciprocal movement in the recess in said frame and having a threaded central axial bore in the end remote from said gauging surface and a transverse bore therethrough, a bolt having a flat end, a threaded portion coacting with the threaded bore of the body section, a slotted portion and an enlarged flange portion the flat end extending into the area defined by the transverse bore in said body section and being in operative relation with the said extended end of said cam rod, said flanged portion having a diameter greater than the width of the said body section and being arranged between the threaded portion and the slotted portion of the bolt, a hollow cap positioned in the base of the recess and encircling the slotted portion of the bolt, said cap having a pin through its end closure slideable in the slotted portion of the bolt, spring means interposed between the cap and the flanged portion of the bolt and adapted to hold the flange in spring-pressed abutment against the shoulder in said recess and locking means adapted to fixedly position said cap.

3. In a gauging device according to claim 2, the combination including an arrangement of the bolt and cap wherein the distance between the flange portion of the bolt and the inner edge of the cap is less than the maximum travel of the indicator operating mechanism.

4. In a gauging device, in combination, a one-piece frame structure having a shouldered recess therein and a passage therethrough, said passage being at right angles to said recess and opening into said recess, an anvil rigidly mounted on the frame and having an exposed gauging surface, an axially hollow spindle body having a transverse bore therethrough, a manually adjustable bolt having an outwardly extending flange adjacent the head end thereof and a true flat surface normal to its longitudinal axis at the other end thereof, the bolt being arranged axially within the spindle body with the true flat surface within the area defined by the transverse bore, said spindle body being movably mounted in said recess and also having an exposed gauging surface, said surface being arranged in operative relation with said first mentioned gauging surface, spring means arranged in the recess adapted to abut the said bolt flange against the shoulder in the recess, an indicator means including an operating mechanism therefor having a tension device whereby the operating mechanism of said indicator is axially projected from within the body of the indicator means, the tension of the spring means being in excess of the tension of the device included in the indicator means, and a rod rotatably mounted in said passage having a cam element on one end extending into the area defined by the transverse bore within the recess and engaging the true flat surface of the manually adjustable bolt and a cam element on the other end engaging the operating mechanism of the indicator means whereby motion imparted to the spindle is transmitted to the indicator means.

5. In a gauging device according to claim 4, the combination including an arrangement of the tensioned spindle and tensioned indicator means wherein the respective tensions are exerted in opposite directions against the cam elements.

6. A gauging device adapted for remote control of an associated dial indicator mechanism, the combination of a one-piece frame structure having a shouldered recess therein and a passage therethrough, said passage being arranged at right angles to and opening into said recess and having a rotatable cam rod mounted therein, one end of said rod extending into the recess an anvil having an exposed gauging surface thereon rigidly mounted on said frame, a spindle assembly comprising a body portion and a bolt movably mounted in the recess and having an exposed gauging surface thereon, said second mentioned gauging surface being arranged in a gauging relation with said first mentioned gauging surface and spaced therefrom, the said spindle body being provided with a central threaded axial hole and a transverse bore, the bolt being manually adjustable and mounted in said threaded hole, said bolt also having its outer end projecting beyond the spindle and a flanged portion adjacent the outer end, the inner end of the bolt being within the area defined by the transverse bore in the spindle body and adapted to coordinate with the extended end of the said cam rod for actuating the dial indicator operating mechanism, and spring means cooperating with said flange portion of said bolt adapted to maintain the flange in constant abutment with the shoulder in said frame recess whereby the locus of the point of contact between said cam rod and said bolt inner end remains fixed during all movement of the bolt due to a manual adjustment of the same.

7. In a gauging device, in combination, a frame structure having a shouldered recess therein and a passage therethrough, said frame passage being at right angles to said frame recess and opening into said recess, an anvil rigidly mounted on the frame and having an exposed gauging surface, a spindle assembly mounted in the frame recess and having an exposed gauging surface, said surfaces being arranged in operative gauging relation, the spindle assembly comprising a reciprocally moveable body section having a threaded axial bore extending partially therethrough beginning at the end remote from said second gauging surface and a transverse bore extending completely therethrough at the locus of the intersection of the frame recess and passage, and a manually adjustable bolt having a threaded portion coacting with and arranged within the axial bore of the spindle body, the inner end of the bolt beyond the threaded portion extending within the transverse bore of the spindle body, the bolt also having a flange portion adapted to abut the shoulder in the frame recess, spring means arranged within the frame recess and abutting the bolt flange whereby said flange is maintained in abutment against the end of the frame recess, an indicator means, and a rod rotatably mounted in the frame passage having a cam element on one end extending within the transverse bore in the spindle body section and engaging the end of the said bolt therein and having a cam element on the other end engaging the operating mechanism of the indicator means whereby motion imparted to the spindle assembly is transmitted to the indicator means.

8. In a gauging device adapted for remote control of an associated dial indicator mechanism, in combination, a frame structure, an exposed gauging surface fixedly mounted on and supported by the frame structure, a second exposed gauging surface and a support assembly therefor movably mounted in a shouldered recess in said frame, the gauging surfaces being arranged in a common plane and in operative gauging relation, said support assembly comprising a body section having a threaded axial bore therein and a transverse bore therethrough and a manually adjustable bolt arranged within said axial bore, the inner end of said bolt projecting into the area defined by said transverse bore, the outer end of said bolt extending beyond the end of said recess remote from the second gauging surface and having a flange thereon in spring-pressed abutment against the shoulder in the said recess, a rotatable rod mounted in the frame structure having one end extending into the area defined by the transverse bore in the support assembly body section and also having a cam element on said extended end in operative engagement with the inner end of said bolt, the other end of said rotatable rod being arranged in operative relation with the dial indicator mechanism.

JOHN CHARLES NILSSON.

REFERENCES CITED

The following references are of record in the file of this patent:

UNITED STATES PATENTS

| Number | Name | Date |
| --- | --- | --- |
| 251,662 | Webb | Dec. 27, 1881 |
| 903,484 | Lane et al. | Nov. 10, 1908 |
| 1,152,761 | Provost | Sept. 7, 1915 |
| 1,617,485 | Hughes | Feb. 15, 1927 |
| 2,016,659 | Tydeman | Oct. 8, 1935 |
| 2,303,530 | Eisele | Dec. 1, 1942 |
| 2,307,323 | Laflamme | Jan. 5, 1943 |
| 2,325,996 | Eiselee | Aug. 3, 1943 |
| 2,412,665 | Young | Dec. 17, 1946 |
| 2,419,433 | Aller | Apr. 22, 1947 |

Certificate of Correction

Patent No. 2,568,558 September 18, 1951

JOHN CHARLES NILSSON

It is hereby certified that error appears in the printed specification of the above numbered patent requiring correction as follows:

Column 6, lines 49 and 50, for "havin" read *having*; column 7, line 30, for "end of" read *shoulder in*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*